United States Patent [19]

Kaminski et al.

[11] Patent Number: 4,784,534

[45] Date of Patent: Nov. 15, 1988

[54] TURN BROACH WITH REDUCED WEAR TOOTH CONFIGURATION

[75] Inventors: Brian D. Kaminski, Troy; Pulak Bandyopadhyay, Rochester Hills, both of Mich.

[73] Assignee: General Motors Corporation, Detroit, Mich.

[21] Appl. No.: 37,660

[22] Filed: Apr. 13, 1987

[51] Int. Cl.[4] .................. B23D 43/02; B23B 5/18
[52] U.S. Cl. .................................. 407/19; 407/12; 82/9
[58] Field of Search .............. 407/12, 13, 15, 18, 407/19; 82/9

[56] References Cited

U.S. PATENT DOCUMENTS

| | | | |
|---|---|---|---|
| 1,089,376 | 3/1914 | Hanson | 407/13 |
| 1,126,107 | 1/1915 | Simmons | 407/53 |
| 1,899,608 | 2/1933 | Bullard | 407/13 |
| 2,123,777 | 7/1938 | Hart | 29/566 |
| 2,645,980 | 7/1953 | Bedker | 407/15 |
| 4,243,347 | 1/1981 | Clapp et al. | 407/15 |
| 4,274,766 | 6/1981 | Raupp et al. | 407/15 |

FOREIGN PATENT DOCUMENTS

| | | | |
|---|---|---|---|
| 547301 | 5/1977 | U.S.S.R. | 407/13 |
| 233609 | 1/1927 | United Kingdom | 407/19 |

OTHER PUBLICATIONS

*Tool and Manufacturing Engineers Handbook* SME, vol. 1, chapter 7, p. 14, Prozok et al.

*Primary Examiner*—Frederick R. Schmidt
*Assistant Examiner*—William E. Terrell
*Attorney, Agent, or Firm*—Patrick M. Griffin

[57] ABSTRACT

An improved cutting tooth configuration in which, unlike the conventional, straight line tool pattern with its constant tool rise, each tooth is incrementally advanced relative to the prior tooth by an amount that progressively decreases. This accounts for the variations in reaction force on the cutting teeth caused by workpiece deflections, so that the net thickness of material removed by each cutting tooth remains relatively constant. Instability and variation in the cutting force are thereby avoided, and tool wear is decreased.

1 Claim, 3 Drawing Sheets

TURN BROACH WITH REDUCED WEAR TOOTH CONFIGURATION

This invention relates to metal machining in general, and specifically to a turn broach having cutting teeth arranged in a novel configuration that gives reduced tooth wear and improved tool life.

BACKGROUND OF THE INVENTION

Rough cast metal workpieces, such as crankshaft castings, must be machined down from their initially rough surface to produce smooth, accurately dimensioned surfaces, such as the bearing main journals. One common machining method is known as plunge turning, in which a single cutting tool is pushed, or "plunged", into the rough surface as the workpiece is rapidly rotated about its axis, removing the excess surface material in one continuous layer. Another method is the so called turn broaching method. Turn broaching is so called because the cutting tool used is a broach, rather than a single tool, and has a series of cutting teeth. The turn broach is moved relative to the rapidly rotating workpiece in such a way that the cutting teeth are incrementally advanced toward and into the rough surface, with the excess material being removed in progressive layers. While turn broaching has proved successful in producing surfaces of the desired quality, and is potentially more economical than plunge turning, tool life and productivity have still not been as great as had been initially hoped.

A typical turn broaching station is illustrated in FIG. 1. A suitable power source 10 rotates a crankshaft rough casting 12 while a turn broach 14 is advanced along a straight path perpendicularly to the axis of rotation. This incrementally advances a series of cutting teeth 16 into the rough outer surface of the casting 12. Excess material is thus progressively nibbled away by the advancing teeth 16. A typical turn broach 14, as shown in FIG. 2, generally consists of a cutter body 18 upon which the teeth 16 are removably mounted, so that they may be easily sharpened or replaced, with wear or breakage. Often, the cutting teeth will be divided up into various discrete sections or groupings, a "bumper" section that sees the workpiece surface first and is designed to remove casting scale, a "rougher" section that sees the workpiece next and removes the bulk of the metal, and a final "finisher" section that brings the machined surface within final specification. The prior art turn broach 14 does not include a bumper or finisher as such, but corresponds to a typical rougher section. Breakage and tool life problems, not surprisingly, are noticed most frequently in the rougher sections, where most of the work is done. A conventional turn broach typically has cutting teeth that are arranged linearly, that is, each tooth is incrementally advanced a uniform amount higher than the prior tooth, with the sum of all tooth increments equaling the total thickness of metal that it is necessary to remove. This incremental advance, at least in the straight line type of turn broach shown in FIG. 2, is generally referred to as the tool rise. To give a specific example, if a ten millimeter total thickness of excess workpiece metal must be removed, and there are ten teeth, then the first tooth is set to take a one millimeter initial depth of cut, and each of the next nine teeth is set one millimeter higher than the prior tooth, so as to machine a one millimeter thick layer each, at least in theory. Thus, the conventional tool rise takes into account only the total thickness of material to be removed, and just divides it up evenly over all the teeth.

A turn broach need not have the teeth arranged in a straight line as such, as in FIG. 2. For example, the cutter body could be arcuate in shape, with the teeth arranged equally angularly spaced, but located in a spiral about an axis of the cutter body. The incremental advance of each tooth, then, is not a tool rise as in the FIG. 2 broach, but is instead a progressively greater radius, measured relative to the cutter body axis. The arcuate turn broach is operated with its axis parallel to the axis of the rotating workpiece, and is then turned about its axis, rather than being advanced in a straight line. The effect is the same, however, which is that the teeth are incrementally advanced into the workpiece surface to progressively machine it down. The basic tooth configuration for the arcuate broach is really the same as the straight line broach. That is, the incremental advance in radius from tooth to tooth is still linear and uniform, and is calculated only on the basis of the total thickness of metal to be removed divided over the number of teeth.

The conventional uniform or linear tool rise described above is often referred to in prior art references in general terms as a "progressive" tooth rise. This conventional cutting tooth configuration has apparently been used almost universally, without questioning its efficiency. The prior art has recognized that as a tool cuts, there are deflections induced in the workpiece, which deflections can cause the workpiece to oscillate and bounce, adversely affecting surface quality. Known attempts in the prior art to deal with this deflection problem, however, have not been satisfactory and have not, so far as is known, involved any significant alteration of the conventional tool rise pattern. For example, the U.S. Pat. No. 2,645,980 to Bedker discloses a broach in which the turning workpiece is confined between a broach and a support block, one on either side of the part, with a resilient spring used to absorb the oscillations. Such a structure is just not practical for production for several reasons, including the greatly increased friction that would result from attempting to trap a rapidly spinning turning part between two surfaces, and because of the extra space required Fundamentally, such a design does nothing to deal with the root cause of the problem, which is part deflection; it merely tries to tolerate it.

The deflection problem is also recognized in the *Tool and Manufacturing Engineers Handbook*, an SME publication, at Chapter 7, page 14, where it is said that the broach finishing teeth may be "back stepped" to compensate for elastic spring back of the workpiece. While the term "back step" is not explained or defined, an accompanying illustration makes it clear what is meant by "back stepping" the finish teeth is that, while they are still in a straight line, the slope of the line is less. That is, the tool rise for the finishing teeth is still uniform or linear, but it is a smaller uniform rise per tooth. In effect, two of the basic tooth patterns described above are placed end to end, but the basic pattern is not altered.

SUMMARY OF THE INVENTION

The subject invention provides a fundamentally different and new cutting tooth configuration, which arose out of a rigorous study of the turn broaching process and the conventional tool rise described above. Using computer simulations and actual machining tests it was discovered that, because of workpiece deflection, the first tooth in the conventional cutting tooth pattern took an actual depth of cut that was less than it should theoretically take. This in turn caused each successive tool to see an even greater net thickness of workpiece material than that which it was designed to remove in an ever worsening pattern. Consequently, a continually increasing reaction force by the workpiece on the cutting teeth was created, which over loaded the later teeth.

A new, non linear cutting tooth pattern was designed, one that controlled the variations in reaction force on the cutting teeth and extended their useful life. The rise of each cutting tooth in the invention is functionally related to the workpiece deflection caused by each preceding tooth, and is not based on the total thickness of material to be removed alone. In the preferred embodiment disclosed, the novel configuration was applied to the rougher section of a crankshaft turn broach, since it saw the greatest reaction forces and greatest wear. An initial depth of cut is set for the first tooth in the rougher, based on the total thickness of material to be removed. The rise of each subsequent tooth is calculated on the basis of a regression formula, giving a non-straight line pattern. Unlike the conventional tool rise, subsequent teeth are not forced to see ever increasing amounts of workpiece material. Instead, each successive tooth removes a layer of material the net thickness of which is more uniform, so that the reaction force on the teeth is distributed more evenly and does not increase rapidly in the later tools. Tooth wear and breakage are reduced. In fact, and even more advantageously, the invention provides a pattern in which the reaction forces on the later teeth, at least initially in the life of the broach, actually decrease. Then, with wear of the early teeth in the series, which reduces their depth of cut, the consequent increase in reaction force on the later teeth can be better tolerated. The magnitude of the reaction forces shift from the earlier to the later teeth, and total tool life is extended even farther. In a conventional broach, wear of the early teeth in the series would cause even greater overstressing of the later teeth.

It is, therefore, a general object of the invention to provide a new configuration for the cutting teeth of a turn broach that will reduce tooth wear and extend tool life.

It is another object of the invention to provide such a configuration in which the incremental advance of each successive tooth is functionally related to the workpiece deflection caused by each prior tooth in the series, thereby controlling the deflection induced variation in reaction force on the cutting teeth and decreasing the consequent wear.

It is still another object of the invention to provide such a new configuration in which the incremental advance of each successive tooth is decreased relative to the incremental advance of each prior tooth, so that the thickness of workpiece material that must be removed by each successive tooth is kept relatively uniform and the reaction force on each tool is thereby also kept substantially uniform over each tooth.

It is yet another object of the invention to provide such a new configuration in which the incremental advance of each tooth is progressively decreased sufficiently that the reaction forces are weighted initially toward the early teeth in the series, so that, with subsequent wear of the earlier teeth, the reaction forces may even out and shift toward the later teeth in the series.

DESCRIPTION OF THE PREFERRED EMBODIMENT

These and other objects and features of the invention will appear from the following written description and from the accompanying drawings, in which.

Figure 1:
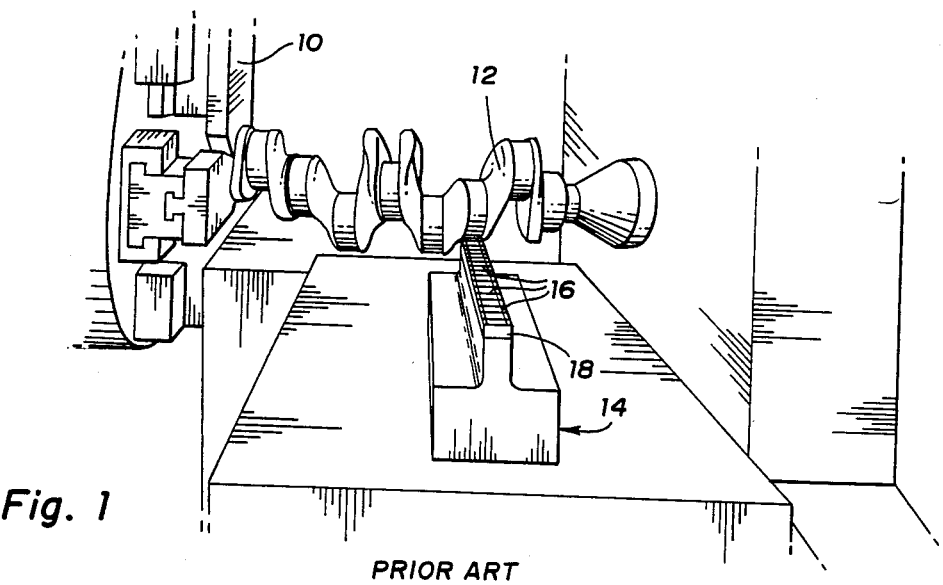
FIG. 1 is a view of a typical turn broaching station.
Figure 2:
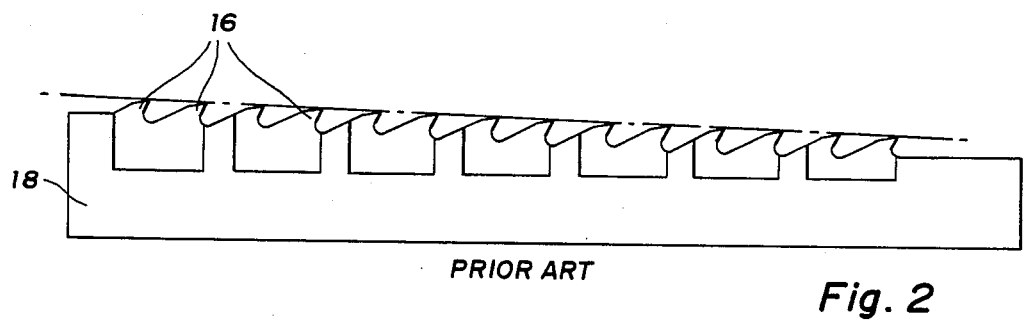
FIG. 2 shows the linear tool rise pattern of a conventional turn broach.
Figure 3:
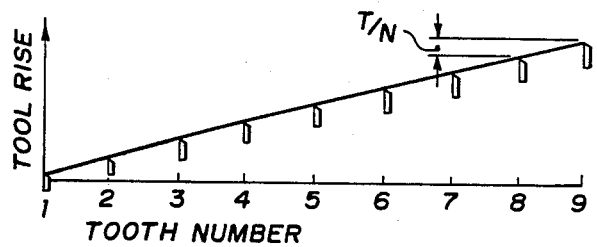
FIGS. 3 through 5 show the results in terms of predicted reaction force and surface finish for a linear tool rise pattern.
Figure 5:
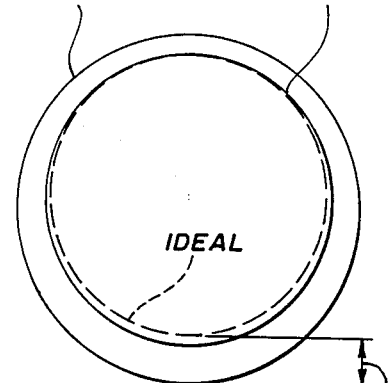
Figure 4:
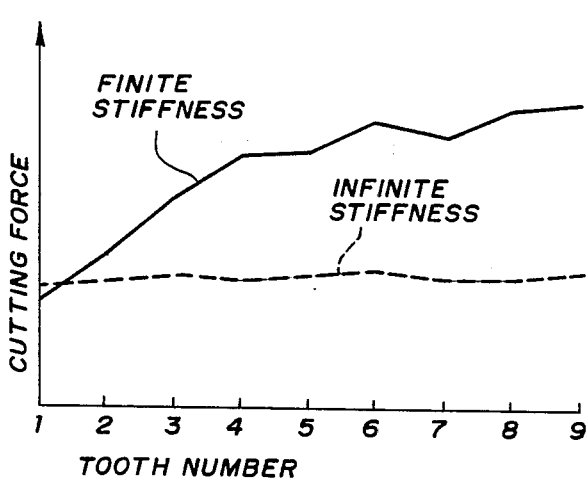
Figure 7:
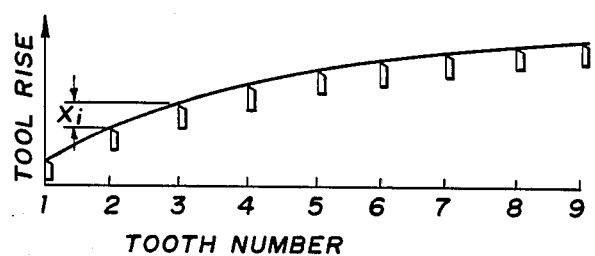
Figure 9:
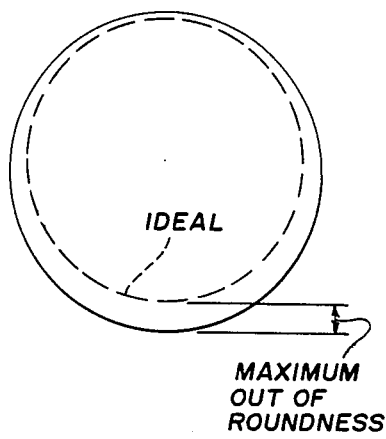
Figure 8:
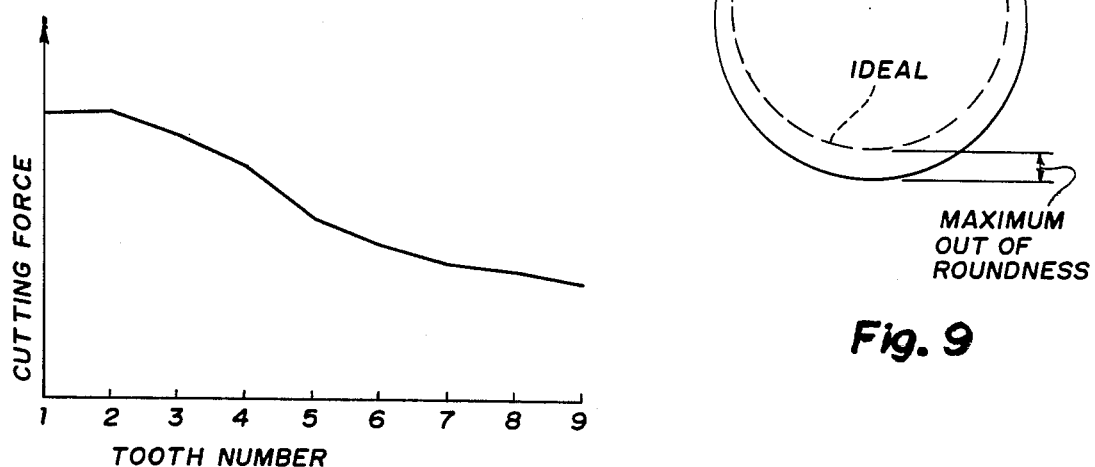
Figure 10:
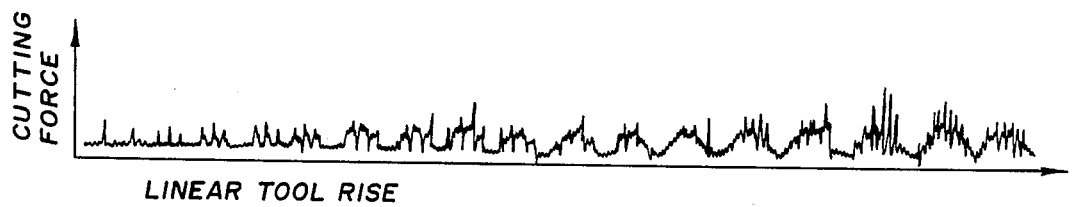
Figure 11:
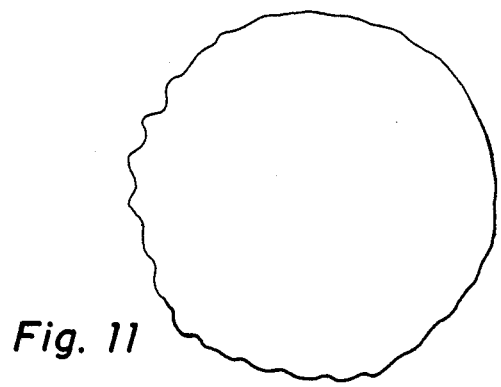
Figure 12:
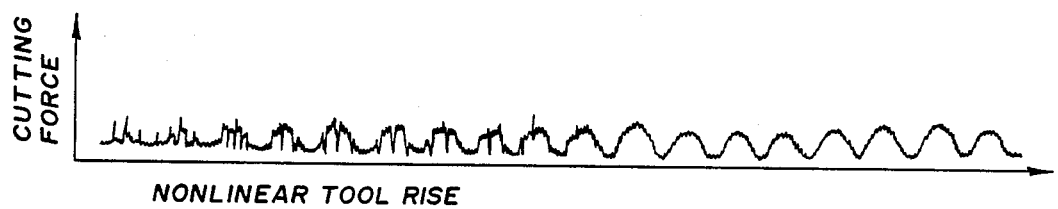
Figure 13:
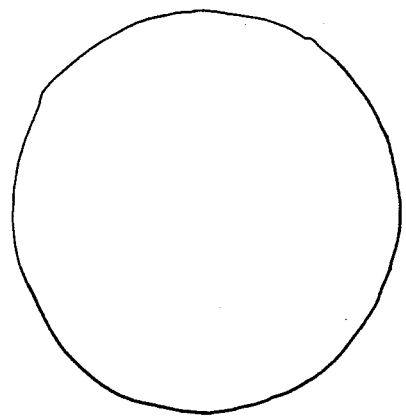

FIGS. 7 through 9 correspond to FIGS. 3 through 5, but for the configuration of the invention;

FIGS. 10 and 11 show actual results in terms of reaction force and surface finish for a linear tool rise pattern;

FIGS. 12 and 13 show actual results in terms of reaction force and surface finish for the invention.

Referring first to FIG. 3, the advantages of the invention are best explained by initially describing the problems caused by the conventional linear tool rise pattern described above, problems that were not previously well realized or appreciated. FIG. 3 diagramatically represents the relative position of the cutting teeth in a conventional turn broach. Here, nine cutting teeth are represented, although any number could be involved. The total thickness of excess workpiece material may be mathematically described most simply in terms of the initial radius of the workpiece minus the final radius. However, since diameters are far easier to measure than radii, it is more practical to quantitatively describe it as the initial diameter, $D_i$, minus the final diameter, $D_f$, divided by two, which may be conveniently represented as the single quantity T. Then, the incremental advance or rise of any cutting tooth in a series of N teeth is simply $D_i$ minus $D_f$, divided by 2N, or T/N.

Referring next to FIGS. 4 and 5, a computer simulation was done to predict the reaction force profile of the workpiece on the cutting teeth, which may be to predict the surface profile of the finished surface, in this case a crankshaft main journal. This was done assuming two different workpiece conditions, one of infinite stiffness, and one of finite stiffness. The ideal or nominal surface profile, of course, is the perfect circle, shown by the dotted line in FIG. 5. However, the geometric nature of the turn broaching process, with the broach being continually advanced as the workpiece is turned, prevents the perfect circle from being achieved. If a workpiece condition of infinite stiffness is assumed, a predicted surface profile very close to the perfect circle results, which is illustrated and so labeled in FIG. 5. Furthermore, the cutting force profile is essentially flat and constant over each tooth, as seen in the dotted line in FIG. 4. Actually, the cutting force seen by any given cutting tooth increases to a maximum and then decreases. Therefore, it will be understood that the force profile really shows the maximum cutting force on each cutting tooth. Assuming a finite stiffness for the workpiece, which better approximates reality, a quite different result is predicted. A maximum cutting force that rises rather steeply for each successive tooth, and a surface profile that is more out of round, are predicted.

The increase in cutting force per successive tooth shown in FIG. 4, and the predicted consequent out of roundness shown in FIG. 5, result from a mechanism that had not been well recognized or dealt with by the prior art. The first cutting tooth in the series induces a deflection of the workpiece away from the tooth, causing it to take less than its ideal or planned depth of cut. As a result, the next cutting tooth sees more incremental rise having been based on the assumption that every tooth would remove the same amount of workpiece material. Consequently, the cutting force on the second tooth is greater than it otherwise would be. This pattern continues and worsens, leading potentially to instability in the cutting force, and also potentially to overstressing and early breakage of the later cutting teeth in the series. In effect, the conventional linear tool rise pattern is logical only for the case of nearly infinite workpiece stiffness, an assumption which is not well founded in fact.

Figure 6:
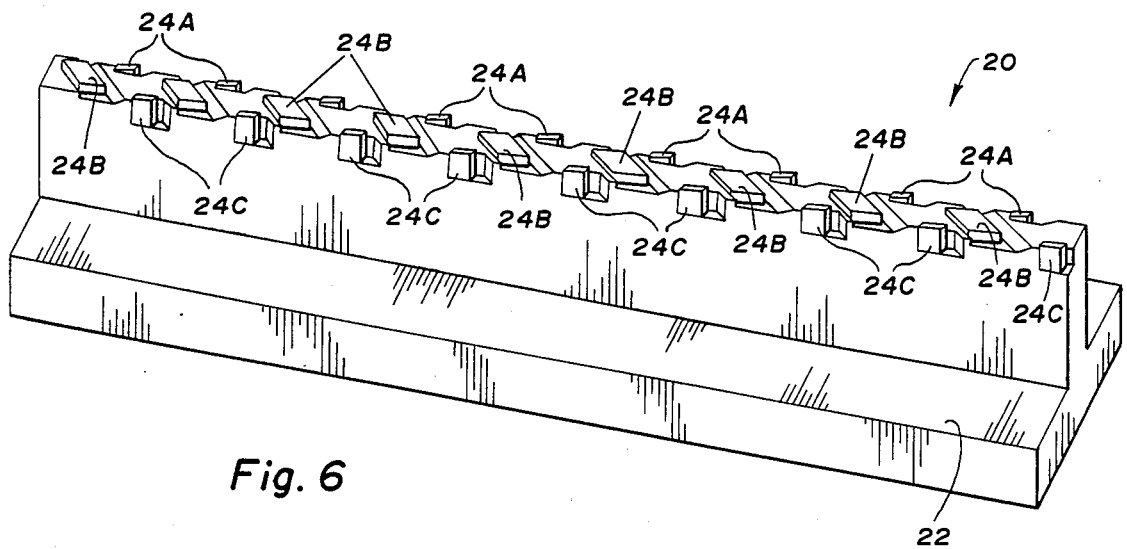
FIG. 6 is a perspective view of the rougher section of a turn broach incorporating the novel tool rise pattern of the invention.

Referring next to FIG. 6, a new tool rise pattern is embodied in the turn broach of the invention, specifically in the rougher section 20 of a turn broach that is used to machine a crankshaft main journal. Rougher 20 includes a solid base or body 22 to which is mounted a series of indexable inserts, which provide the cutting teeth. As will be well known to those skilled in the art, indexable inserts are removably mounted and disposable, generally having eight identical cutting corners. They are turned or "indexed" periodically until all eight cutting corners are used up, whereupon the insert is replaced. Therefore, the most telling measure of productivity for any particular configuration is the number of parts that can be machined before the insert must be replaced. In the embodiment disclosed here, the cutting teeth comprise three sets of nine teeth, a first set of side teeth 24A, a central set of teeth 24B, and a second set of side teeth 24C. These three sets of teeth 24 A, B, and C are all evenly spaced, which is referred to as the pitch, but are staggered relative to one another. The two sets of side teeth 24A and 24C cut the sides of the journal, while the central teeth 2B cut the center. The total length of the teeth 24 is 495 mm, and the lateral spacing or width between the two sets of side teeth 24A and 24C is 27.05 mm, which is the same as the width of the journal surface that they machine. While the pitch of all three sets of teeth 24 A, B, and C is uniform, the incremental advance or tool rise is not, as will be described in detail below.

Referring next to FIG. 7, each of the three sets 24A, 24B and 24C are independently arranged in the novel configuration of the invention. According to the invention, the cutting teeth do not lie in a straight line and do not have a uniform, constant incremental advance or tool rise. Instead, while each tooth is higher than the prior tooth, the amount of the incremental advance or tool rise of any given tooth is less than, but functionally related to, the incremental advance of the previous tooth. For the computer simulation that was done, the incremental advance or rise of each tooth was calculated on the basis of a regression formula $$X_i = [(X_{i-1})(1-(A/100))]$$

where "i" stands for the second through the last tooth, there being no tooth prior to the first. "A" is the desired percentage of successive decrease. Clearly, the starting point must be the calculation of the incremental advance of the first tooth, $X_1$, which is the initial depth of cut that the cutting tool takes. The formula used to calculate $X_1$ is $$X_1 = (T)(A/100)/[1-(1-(A/100))expN]$$

where N is the total number of teeth. Once $X_1$ is so calculated, the increments of advance of the subsequent cutting teeth may be simply calculated from the regression formula. The value for "A" may be any desired percentage decrease, which may be chosen on the basis of experiment or other factors. If a computer simulation is initially used, as here, then any number of different A values may be relatively easily tried. Using this formula, for any N, adding all the increments together gives T, the total thickness of workpiece material to be removed, just as with a linear tool rise. Even though the same total thickness of workpiece material is removed by the same total number of teeth as with the linear tool rise, the results are significantly improved in terms of wear and productivity, as will be next described.

Referring next to FIGS. 8 and 9, in the preferred embodiment disclosed, the value of A was set at 15%, and a predicted cutting force profile and journal surface profile were computer generated. As seen in FIG. 8, the reaction or cutting force profile predicted, beyond being flattened out, actually decreases over the whole series of cutting teeth. If A were chosen to be less that 15%, that profile would be flatter, closer to a constant. That in itself would be an improvement over the steeply increasing force profile of the linear design, as it would better distribute the of teeth. However, the specific embodiment disclosed presents an additional advantage. With use, the early cutting teeth in the series will inevitably wear somewhat, decreasing the net thickness of the layer of workpiece material that they remove, and thereby increasing the net thickness of material seen by the latter teeth. The cutting force and consequent wear on the later teeth will be increased. With the force profile of FIG. 8, the cutting forces are initially more heavily distributed over the early cutting teeth in the series, so that the distribution can, with increasing use and wear, flatten out and shift to the later teeth. Overall tool life can thus be extended even more. As seen in FIG. 9, the computer simulation also predicted a significantly smaller out of roundness condition for a rougher 20 with the non linear design of the invention.

Referring next to FIGS. 10 through 13, the rougher section 20 described above was tested under production conditions. A great advantage of the invention is that, since it is incorporated just in the novel arrangement of basically old, commercially available parts, it may be quickly and economically applied in production. For the tests run here, the prior production parameters were maintained, so that any increase in productivity would be readily apparent, and clearly the result only of the novel configuration of the cutting teeth. The computer predictions for the invention were confirmed, and productivity and tool life were very significantly improved. The workpiece was the cast iron crankshaft casting 12 noted above, and the surface machined was a main bearing journal, which had a total thickness of approximately 3.5 mm of excess material to be removed. The speed with which the crankshaft casting 12 was rotated as it was fed over the rougher 20 was 700 RPM, and the feed rate of the broach was 2.03 m/min. For the conventional rougher, as seen in FIGS. 10 and 11, the cutting force had an increasing trend with significant spiking and instability, and the surface profile reflected that fact. While the finisher section of the broach still brought the final finished surface within specification, there was more resultant wear on the entire broach than was desirable. In quantitative terms, approximately 250 castings could be machined before the inserts that provided the cutting teeth had to be changed. With the rougher 20 of the invention, however, as seen in FIGS. 12 and 13, a significantly more stable cutting force profile and a significantly better surface profile were obtained. This translated into less wear and tool breakage in the rougher 20, and less wear on the finisher as it brought the surface within specification. Parts per insert change increased very significantly, to approximately 850. It was also noted that the rougher 20 of the invention ran far more quietly.

The invention may be embodied in tools other than the rougher 20 disclosed. It has already been noted that a smaller value for "A", with a corresponding flatter cutting force profile, could be used. The same basic tooth configuration could be applied to an arcuate broach, as well. The teeth in a corresponding arcuate broach would be arranged with radii that had incremental advances derived from the same formula. The same pattern could be applied to other broach sections, as well, although the advantages are most apparent in the rougher. The broadest concept of the invention is to functionally relate the incremental rise of each tooth in the series to the workpiece deflection that has been caused by the prior tooth, so as to control the reaction force 1 variations caused by those deflections and thereby decrease wear. A cutting tool designed with that fundamental concept in mind need not necessarily entail, in all cases, a tool rise in which the incremental advance decreases from tooth to tooth, or over all teeth. For example, it might be desired to machine a part that had layers of varying harnesses and stiffnesses. An example would be a part with a case hardened outer layer. There, the initial teeth might well have a linear rise, or almost no rise at all. The later teeth would then have incremental advances tailored to the stiffnesses and hardnesses of the workpiece layers that they would actually see. Therefore, it will be understood that the invention is not intended to be limited to the exact embodiment disclosed.

The physical embodiments of the invention in which an exclusive property of privilege is claimed are defined as follows:

1. In a cutting tool of the type that has a series of N cutting teeth used to machine a layer of thickness T from the surface of a workpiece that rotates about an axis as the tool is advanced along a straight line perpendicular to said axis, the improvement comprising, said teeth being configured such that the incremental advance of the first tooth is determined according to the formula T times $(A/100)/[1-(1-A/100))expN]$ where N is the total number of teeth and A stands for a predetermined percentage of successive decrease in the incremental tooth advance, and with the remaining teeth in the series being is less than the incremental advance of each previous tooth according to the formula $X_i=[(X_i-1)(1(A/100)))]$, where "i" stands for the second through the Nth tooth.

* * * * *

UNITED STATES PATENT AND TRADEMARK OFFICE
CERTIFICATE OF CORRECTION

PATENT NO. : 4,784,534

DATED : November 15, 1988

INVENTOR(S) : Brian D. Kaminski and Pulak Bandyopadhyay

It is certified that error appears in the above-identified patent and that said Letters Patent is hereby corrected as shown below:

In column 8, line 30, "(1(A/100)))]" should instead read -- (1-(A/100))] --.

Signed and Sealed this

Fifth Day of June, 1990

Attest:

HARRY F. MANBECK, JR.

*Attesting Officer*   *Commissioner of Patents and Trademarks*